United States Patent
Alexander et al.

(10) Patent No.: US 8,800,282 B2
(45) Date of Patent: Aug. 12, 2014

(54) VEHICLE ENERGY HARVESTING DEVICE HAVING DISCRETE SECTIONS OF SHAPE MEMORY ALLOY

(75) Inventors: Paul W. Alexander, Ypsilanti, MI (US);
Alan L. Browne, Grosse Pointe, MI (US); Patrick B. Usoro, Troy, MI (US);
Nilesh D. Mankame, Ann Arbor, MI (US); Xiujie Gao, Troy, MI (US);
Marten Wittorf, Ingelheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 715 days.

(21) Appl. No.: 12/947,932

(22) Filed: Nov. 17, 2010

(65) Prior Publication Data

US 2011/0120119 A1   May 26, 2011

Related U.S. Application Data

(60) Provisional application No. 61/263,293, filed on Nov. 20, 2009.

(51) Int. Cl.
*F02G 1/04* (2006.01)
*F01B 29/10* (2006.01)

(52) U.S. Cl.
USPC .................. 60/527; 60/528; 60/529; 60/516

(58) Field of Classification Search
USPC .................................. 60/527, 516, 528, 529
See application file for complete search history.

(56) References Cited

U.S. PATENT DOCUMENTS

| | | | |
|---|---|---|---|
| 534,871 A * | 2/1895 | French | 60/527 |
| 3,053,463 A * | 9/1962 | De Milleville | 239/584 |
| 3,316,415 A * | 4/1967 | Taylor | 290/1 R |
| 4,055,955 A * | 11/1977 | Johnson | 60/527 |
| 4,150,544 A | 4/1979 | Pachter | |
| 4,246,754 A * | 1/1981 | Wayman | 60/527 |
| 4,794,752 A * | 1/1989 | Redderson | 60/531 |
| 5,442,914 A | 8/1995 | Otsuka | |
| 6,880,336 B2 * | 4/2005 | Howard | 60/527 |
| 7,444,350 B1 | 10/2008 | MacKinnon et al. | |

FOREIGN PATENT DOCUMENTS

| | | |
|---|---|---|
| DE | 10108468 A1 | 9/2002 |
| JP | 60022079 A | 2/1985 |

(Continued)

OTHER PUBLICATIONS

"NPL1—Discrete (Merriam-Webster Dictionary)" definintion of "discrete" from www.merriam-webster.com, accessed Oct. 27, 2013 (4 pages).*

(Continued)

*Primary Examiner* — Kenneth Bomberg
*Assistant Examiner* — Daniel Wagnitz
(74) *Attorney, Agent, or Firm* — Quinn Law Group, PLLC

(57) ABSTRACT

An energy harvesting system comprises a first region and a second region having a temperature difference therebetween. A heat engine is configured for converting thermal energy to mechanical energy. The heat engine includes a first discrete element of a shape memory alloy having a crystallographic phase changeable between austenite and martensite in response to the temperature difference between the first region and the second region. The first discrete element of the shape memory alloy expands and contracts in response to the phase change to exert a linear force. A motion conversion mechanism is operatively connected to the first discrete element to be driven by the linear force and a component is driven by the motion conversion mechanism.

11 Claims, 8 Drawing Sheets

(56) References Cited

FOREIGN PATENT DOCUMENTS

| JP | 5118272 A | 5/1993 |
|---|---|---|
| JP | 2003232276 A | 8/2003 |
| JP | 2005002978 A | 1/2005 |

OTHER PUBLICATIONS

"NPL2—Discrete (Dictionary.com)" definition of "discrete" from www.dictionary.reference.com, accessed Oct. 27, 2013 (2 pages).*
"NPL3—Discrete (Free Online Dictionary)" definition of "discrete" from www.thefreedictionary.com, accessed Oct. 27, 2013 (3 pages).*

* cited by examiner

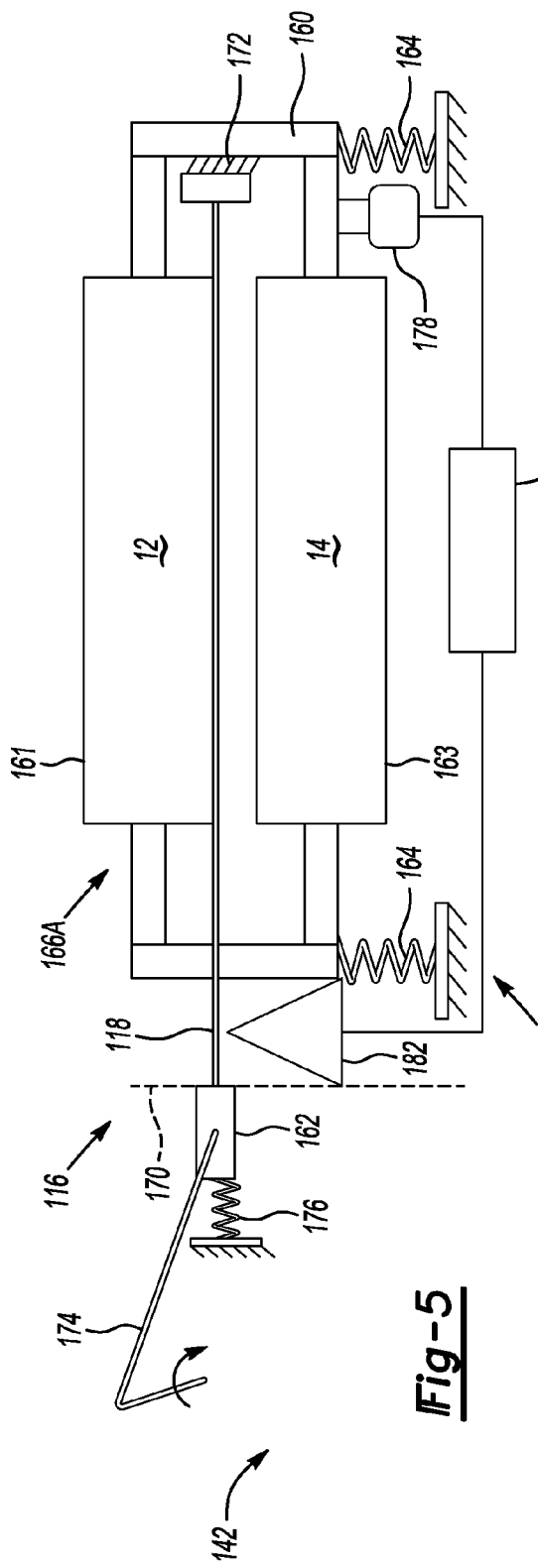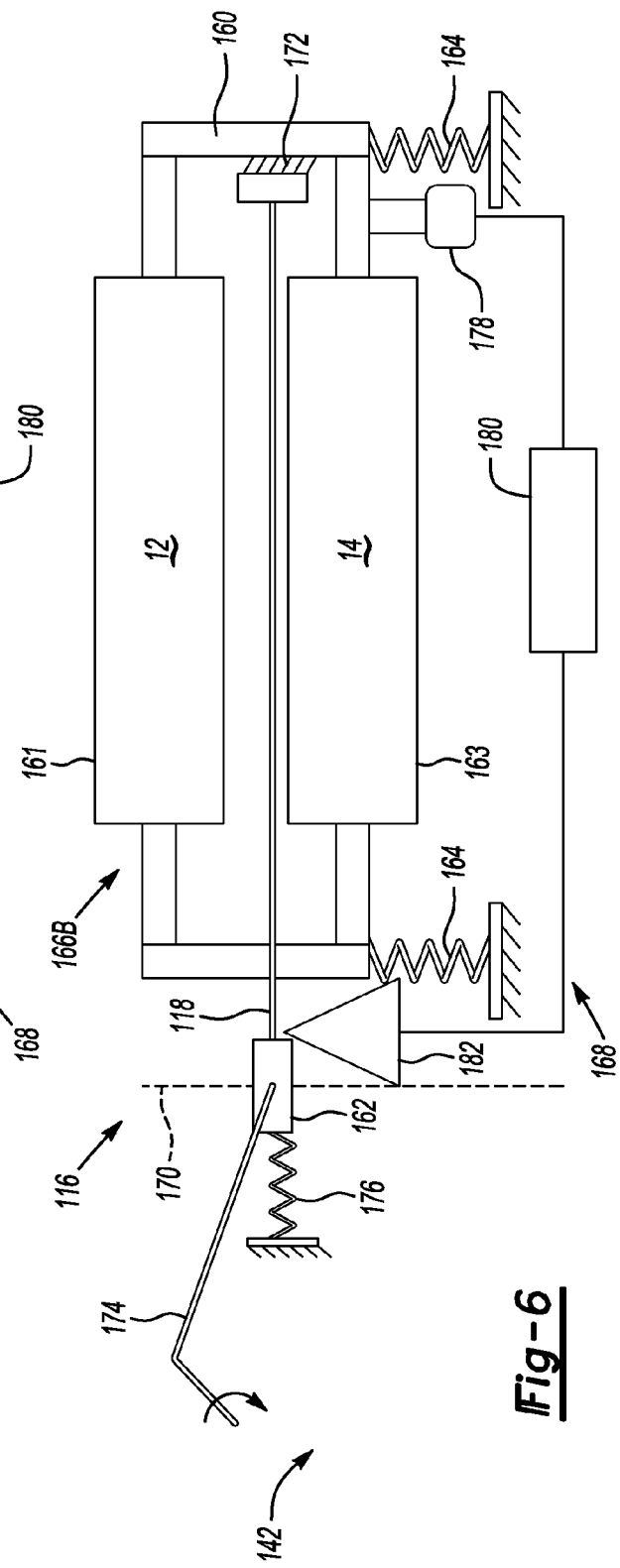

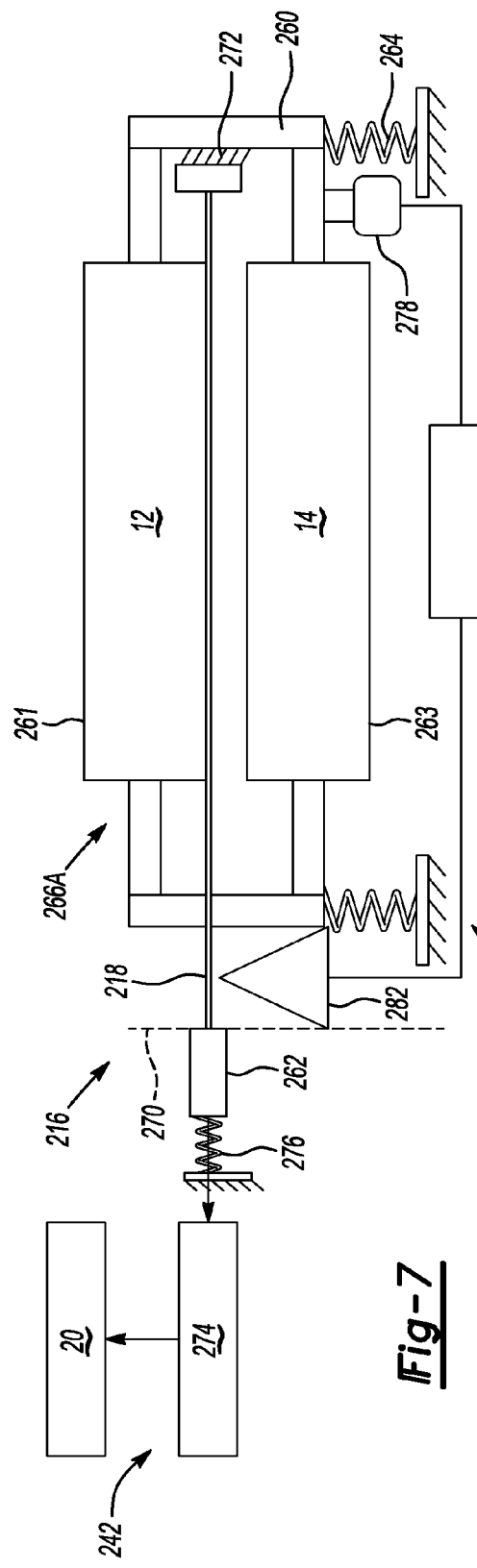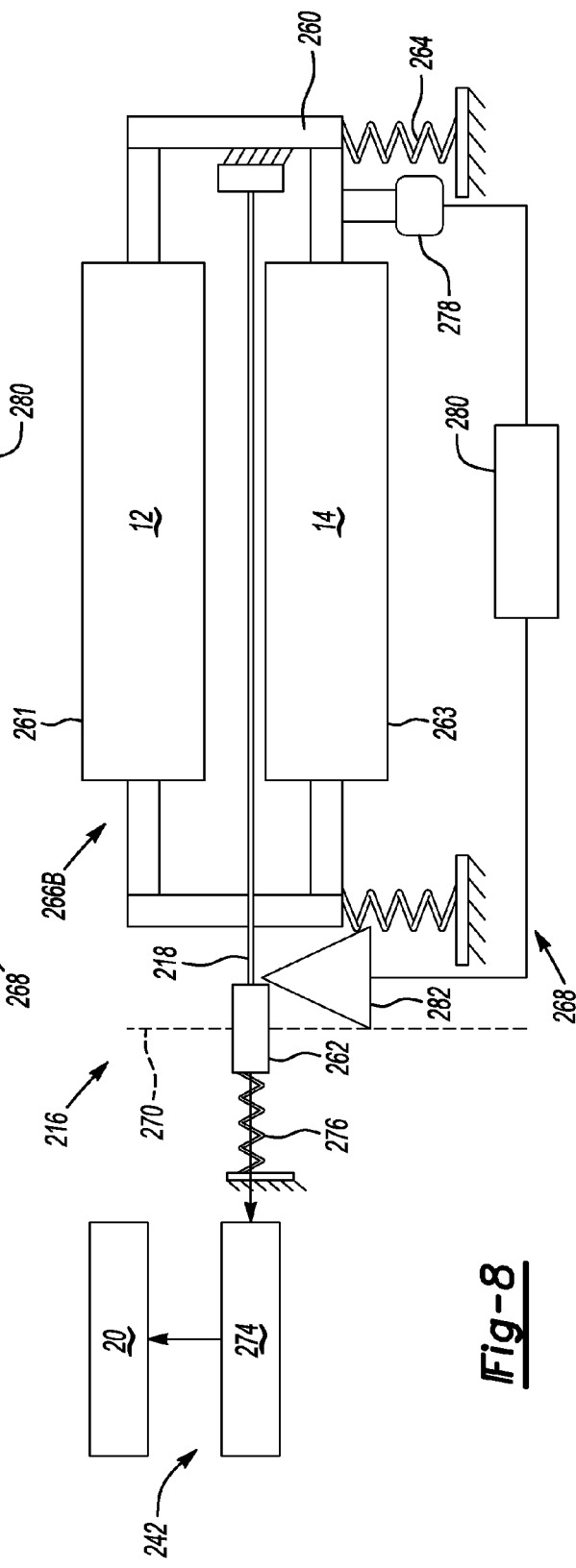

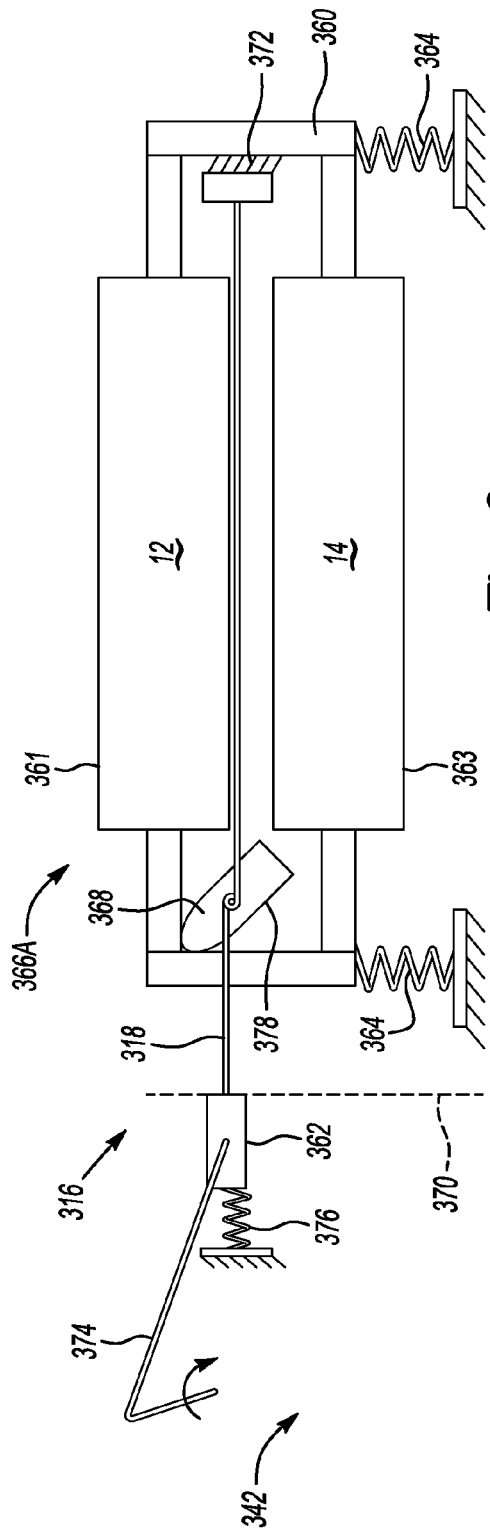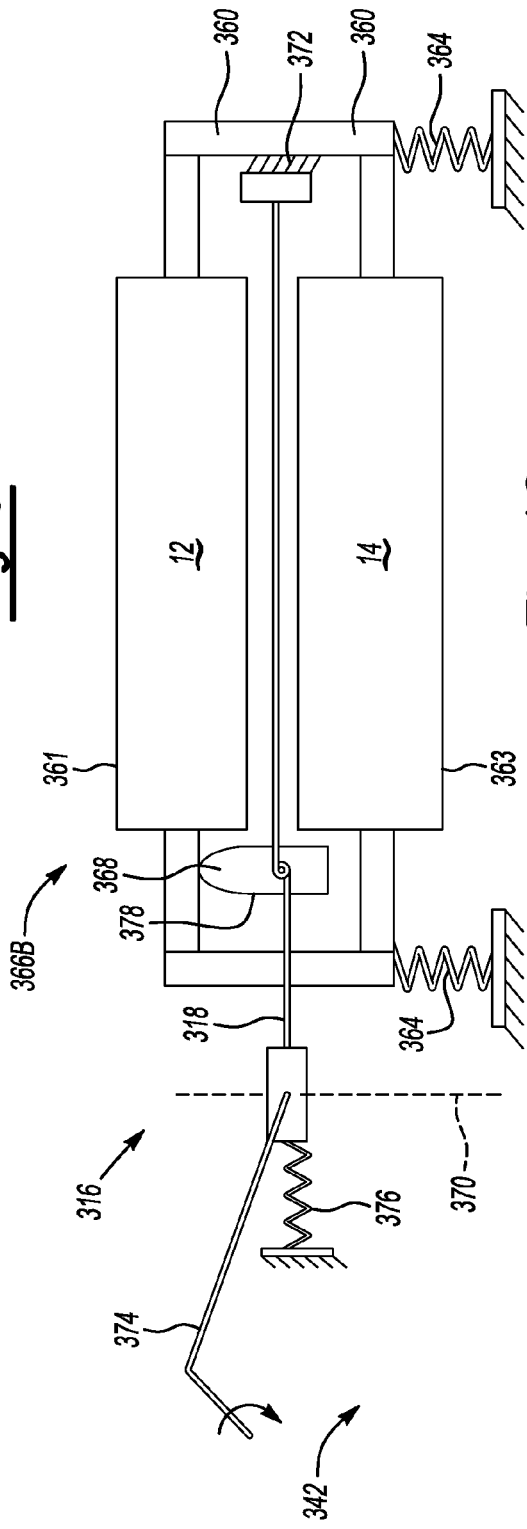

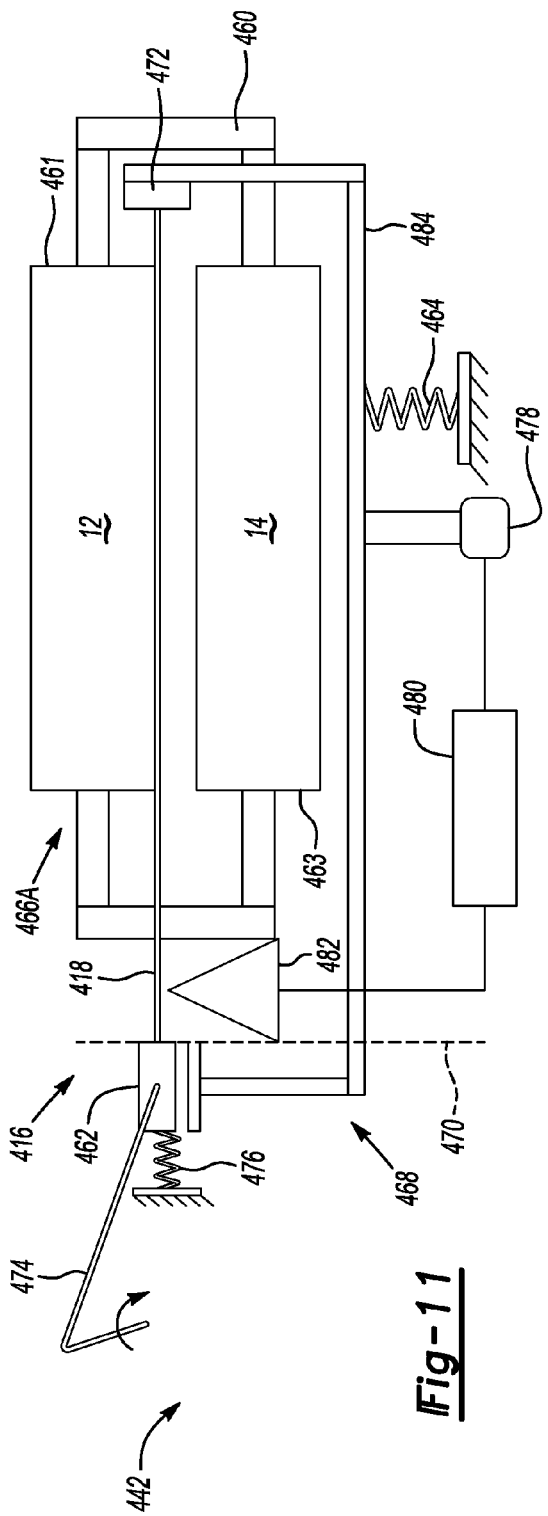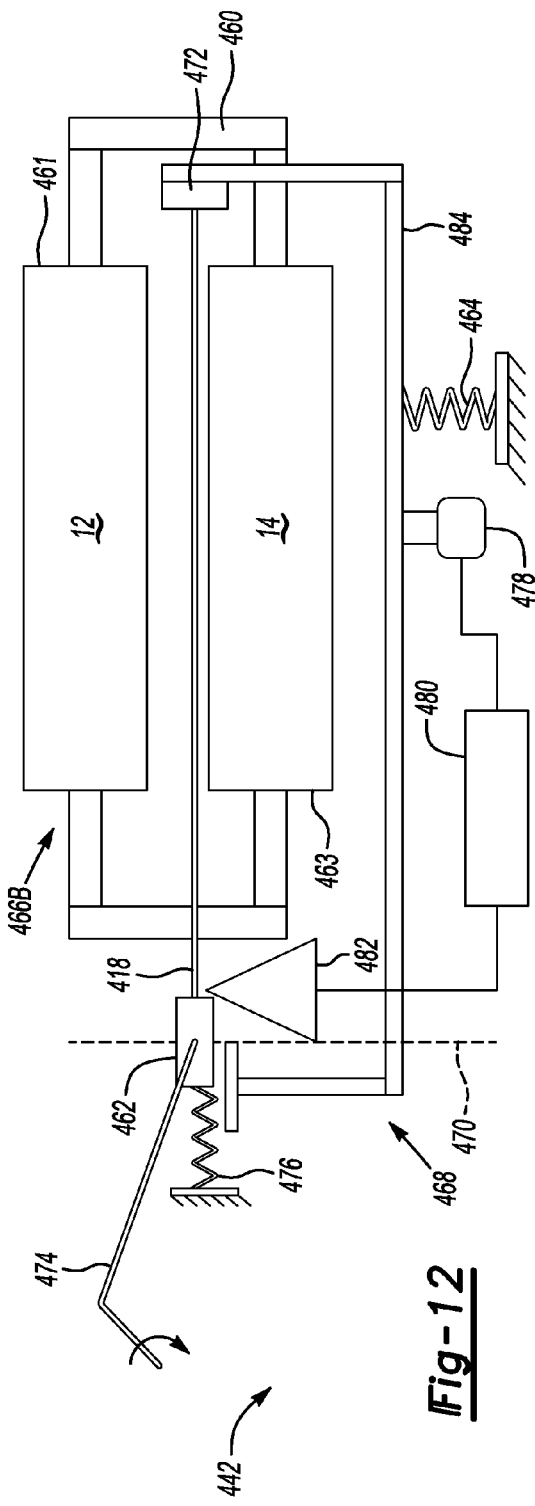

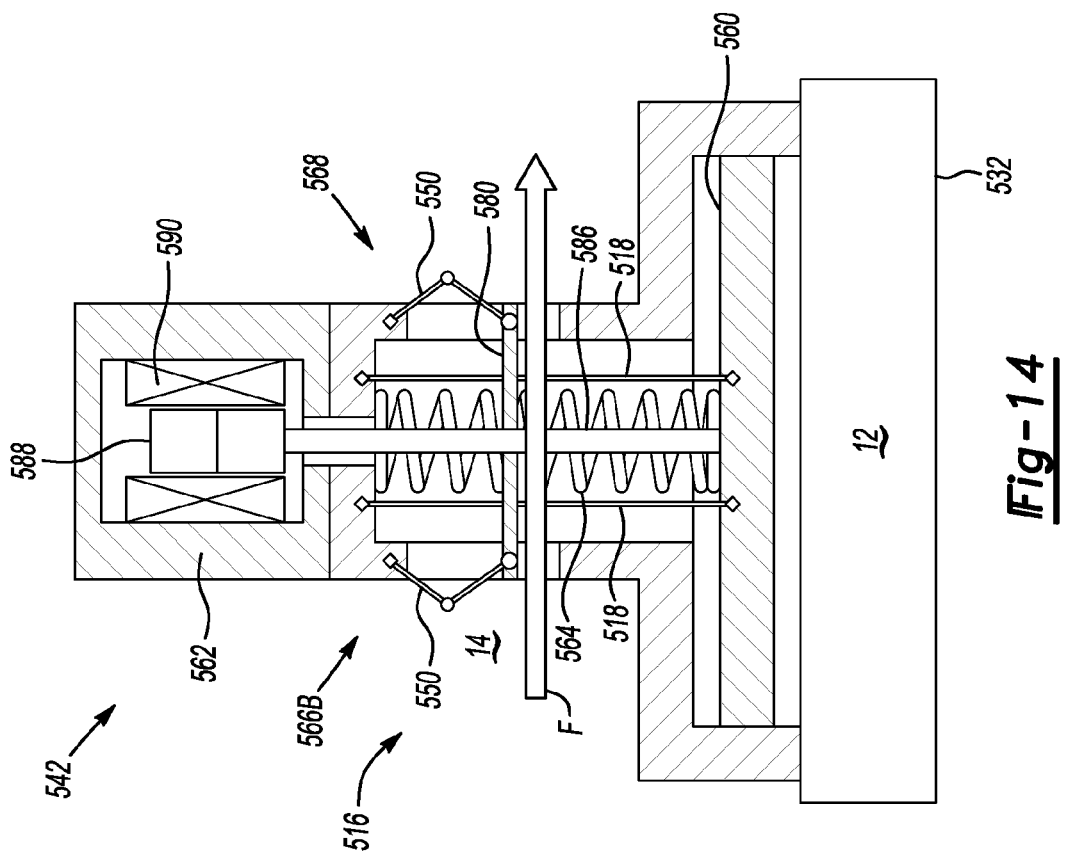
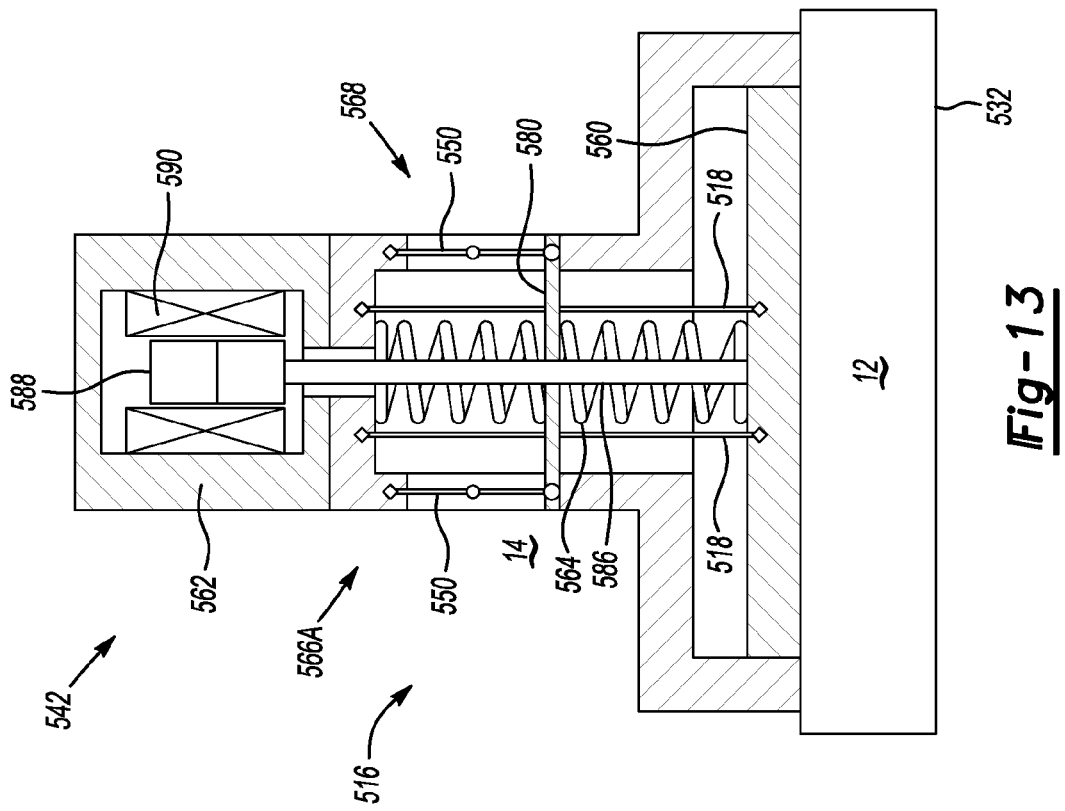

VEHICLE ENERGY HARVESTING DEVICE HAVING DISCRETE SECTIONS OF SHAPE MEMORY ALLOY

CROSS REFERENCE TO RELATED APPLICATIONS

This application claims the benefit of U.S. Provisional Application Ser. No. 61/263,293 filed Nov. 20, 2009, the entire contents of which are hereby incorporated by reference.

TECHNICAL FIELD

The present invention generally relates to a vehicle, and more specifically, to an energy source for the vehicle and vehicle accessories.

BACKGROUND OF THE INVENTION

Vehicles are traditionally powered by engines that drive the vehicle and batteries that provide power for starting the engine and for vehicle accessories. Advancements in technology and a desire for driver conveniences have increased the number of vehicle accessories, as well as increased the load, i.e., power demand, on the engine and/or the battery required to power the vehicle accessories. In addition, the vehicle power sources and components produce a large quantity of waste heat, i.e., waste thermal energy that is typically dissipated into the atmosphere and lost.

Accordingly, arrangements for extending driving range and increasing the fuel efficiency of the vehicle are desirable. Therefore, systems that increase the fuel efficiency of the vehicle and reduce the power load on the vehicle's traditional power sources, i.e., the engine and/or the battery, are desirable, and significant vehicle fuel economy gains may be realized if the vehicle's waste heat is converted into usable mechanical and/or electrical energy.

SUMMARY

An energy harvesting system comprises a first region having a first temperature and a second region having a second temperature that is different from the first temperature. A heat engine is configured for converting thermal energy to mechanical energy. The heat engine includes a first discrete element of a shape memory alloy having a crystallographic phase changeable between austenite and martensite in response to the temperature difference between the first region and the second region. The first discrete element of the shape memory alloy expands and contracts in response to the phase change to exert a linear force. A motion conversion mechanism is operatively connected to the first discrete element to be driven by the linear force and a component is driven by the motion conversion mechanism.

A method of harvesting energy comprises exposing a first discrete element of a shape memory alloy to heat exchange contact with a first region having a first temperature and a second region having a second temperature that is different from the first temperature. The first discrete element of the shape memory alloy is expanded and contracted in response to the temperature difference between the first region and the second region, such that a linear displacement of at least a portion of the first discrete element of the shape memory alloy occurs. A motion conversion member is driven by the linear displacement of the first discrete element of the shape memory alloy and a component is driven by the motion conversion mechanism.

An energy harvesting system comprises a first region having a first temperature, and a second region having a second temperature that is different from said first temperature. A heat engine is configured for converting thermal energy to mechanical energy. The heat engine includes a first discrete element of a shape memory alloy having a crystallographic phase changeable between austenite and martensite in response to a temperature difference between the first region and the second region. The first discrete element of the shape memory alloy expands and contracts in response to the phase change to exert a linear force. An actuator moves the first region and the second region relative to the first discrete element of the shape memory alloy such that the first discrete element of the shape memory alloy is alternately exposed to both the first region and the second region. The actuator moves the first region and the second region based upon the temperature of the discrete element of the shape memory alloy. A motion conversion mechanism is operatively connected to the first discrete element to be driven by the linear force. A component is driven by the motion conversion mechanism.

The above features and advantages, and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

FIG. 5 is a schematic side view of a second embodiment of the energy harvesting system of FIG. 1 in a first position;

FIG. 6 is a schematic side view of the second embodiment of the energy harvesting system of FIGS. 1 and 5 in a second position;

FIG. 7 is a schematic side view of a third embodiment of the energy harvesting system of FIG. 1 in a first position;

FIG. 8 is a schematic side view of the third embodiment of the energy harvesting system of FIGS. 1 and 7 in a second position;

FIG. 9 is a schematic side view of a fourth embodiment of the energy harvesting system of FIG. 1 in a first position;

FIG. 10 is a schematic side view of the fourth embodiment of the energy harvesting system of FIGS. 1 and 19 in a second position;

FIG. 11 is a schematic side view of a fifth embodiment of the energy harvesting system of FIG. 1 in a first position;

FIG. 12 is a schematic side view of the fifth embodiment of the energy harvesting system of FIGS. 1 and 11 in a second position;

FIG. 13 is a schematic cross-sectional view of a sixth embodiment of the energy harvesting system of FIG. 1 in a first position; and FIG. 14 is a schematic cross-sectional view of the sixth embodiment of the energy harvesting system of FIGS. 1 and 13 in a second position.

DESCRIPTION OF THE PREFERRED EMBODIMENTS

Figure 1:
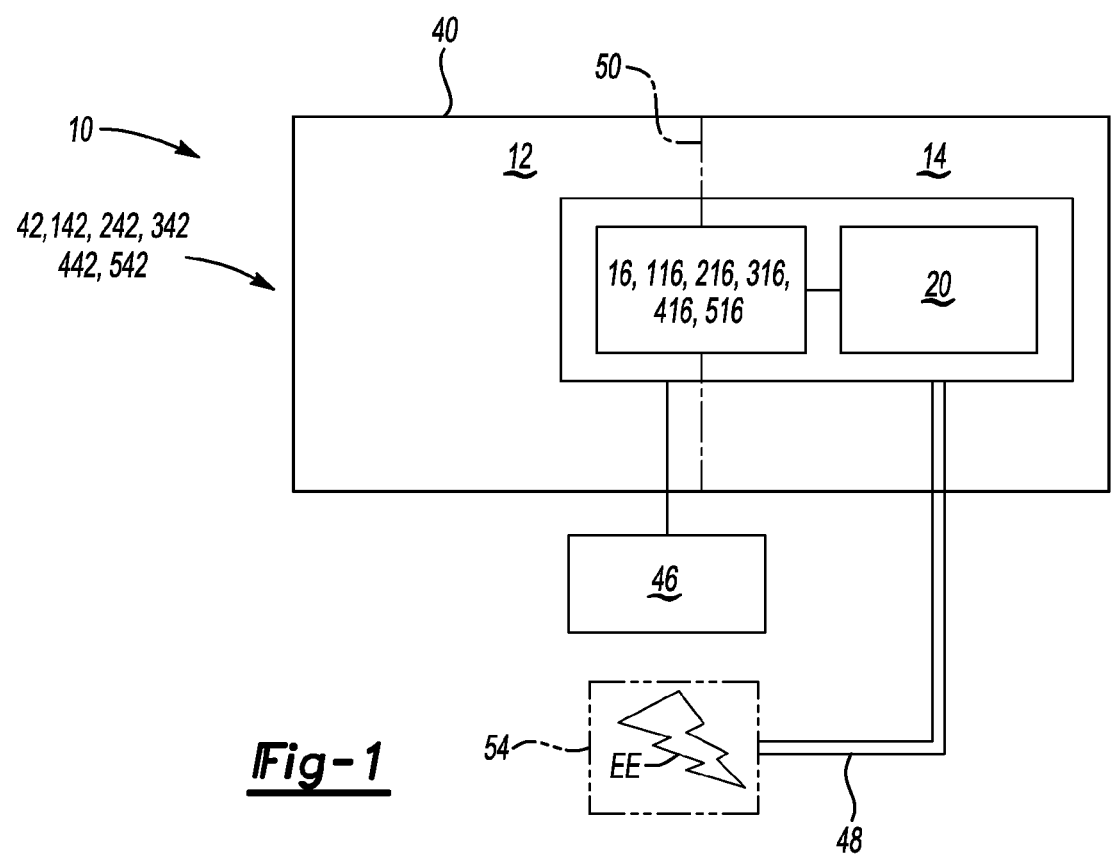
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 42, 142, 242, 342, 442, 542. The energy harvesting system 42, 142, 242, 342, 442, 542 utilizes a temperature difference between a first region 12 and a second region 14 to generate mechanical or electrical energy, and therefore may be useful for automotive applications. However, it is to be appreciated that the energy harvesting system 42, 142, 242, 342, 442, 542 may also be useful for non-automotive applications. The energy harvesting system 42, 142, 242, 342, 442, 542 includes a heat engine 16, 116, 216, 316, 416, 516. The heat engine 16, 116, 216, 316, 416, 516 is configured for converting thermal energy, e.g., heat, to mechanical or heat to mechanical and then to electrical energy, as set forth in more detail below.

The vehicle 10 defines a compartment 40 which may house power and drive sources for the vehicle 10, such as an engine and transmission (not shown). The compartment 40 may or may not be enclosed from the surrounding environment, and may include regions and components exterior to the vehicle 10 such as an exhaust pipe and catalytic converter, shock absorbers, brakes, and any other region where energy is dissipated as heat proximate to or in the vehicle 10 such as in a passenger compartment, engine compartment, or a battery compartment (such as in an electric vehicle).

The energy harvesting system 42, 142, 242, 342, 442, 542 is at least partially located within the compartment 40. The power and drive sources (not shown) for the vehicle 10 typically generate heat. Therefore, the compartment 40 includes the first region 12 and the second region 14 having a temperature difference therebetween. The first region 12 and the second region 14 may be spaced apart from one another to provide a sufficient heat exchange barrier 50 between the first region 12 and the second region 14.

Fluid within the energy harvesting system 42, 142, 242, 342, 442, 542 may fill the first region 12 and the second region 14 and may be selected from a group of gases, liquids, and combinations thereof. The fluid within the first region 12 may be a different fluid than the fluid within the second region. In the embodiment discussed above where the compartment 40 is an engine compartment, fluid within the first region 12 and the second region 14 is air within the compartment 40. Objects located within the first region 12 and the second region 14 may generate or dissipate heat to the fluid surrounding the object and forming the first region 12 and the second region 14. Alternatively, the first region 12 and/or the second region 14 may be the object that is the heat source or heat sink and the energy harvesting system 42, 142, 242, 342, 442, 542 may have physical contact with the first region 12 and the second region 14 to take advantage of the temperature difference therebetween.

Several examples within a vehicle 10 where the energy harvesting system 42, 142, 242, 342, 442, 542 may take advantage of temperature differentials are proximate to or incorporated with an exhaust system, including proximity to a catalytic converter, next to a battery for the vehicle or within a battery compartment for electric vehicles, proximate to a transmission, brakes, or components of the vehicle suspension in particular a shock absorber, or proximate to or incorporated within a heat exchanger, such as a radiator. The above examples list areas of the vehicle 10 which may act as one of the first region 12 or the second region 14. The energy harvesting system 42, 142, 242, 342, 442, 542 may be positioned such that the other of the first region 12 or the second region 14 is separated by a sufficient heat exchange barrier 50 to provide the required temperature differential. The above list only provides examples of where the energy harvesting system 42, 142, 242, 342, 442, 542 may be located and is not intended to be all inclusive of arrangements for the energy harvesting system 42, 142, 242, 342, 442, 542. One skilled in the art would be able to determine areas having an associated temperature differential and an appropriate position for the energy harvesting system 42, 142, 242, 342, 442, 542 to take advantage of the temperature differences.

The energy harvesting system 42, 142, 242, 342, 442, 542 also includes a driven component 20. The component 20 may be a simple mechanical device, selected from a group including a fan, a belt, a clutch drive, a blower, a pump, a compressor and combinations thereof. The component 20 is driven by the heat engine 16, 116, 216, 316, 416, 516. The component 20 may be part of an existing system within the vehicle 10 such as a heating or cooling system. The mechanical energy may drive the component 20 or may assist other systems of the vehicle 10 in driving the component 20. Driving the component 20 with power provided by the heat engine 16, 116, 216, 316, 416, 516 may also allow an associated existing system within the vehicle 10 to be decreased in size/capacity providing weight savings in addition to the energy savings.

Alternately, the component 20 may be a generator or part of a generator. The component/generator 20 is configured for converting mechanical energy from the heat engine 16, 116, 216, 316, 416, 516 to electricity (represented generally by symbol EE in FIG. 1). The component/generator 20 may be any suitable device for converting mechanical energy to electricity EE. For example, the component/generator 20 may be an electrical generator that converts mechanical energy to electricity EE using electromagnetic induction, and may include a rotor (not shown) that rotates with respect to a stator (not shown). The electrical energy EE from the component/generator 20 may than be used to assist in powering the main or accessory drive systems within the vehicle 10.

As explained above, the energy harvesting system 42, 142, 242, 342, 442, 542 is configured for generating mechanical or electric energy and includes structure defining the first region 12 having a first temperature and structure defining the second region 14 having a second temperature that is different from the first temperature.

In one variation, the energy harvesting system 42, 142, 242, 342, 442, 542 also includes an electronic control unit 46. The electronic control unit 46 is in operable communication with the vehicle 10. The electronic control unit 46 may be, for example, a computer that electronically communicates with one or more controls and/or sensors of the energy harvesting system 42, 142, 242, 342, 442, 542. For example, the electronic control unit 46 may communicate with and/or control one or more of a temperature sensor within the first region 12, a temperature sensor within the second region 14, a speed regulator of the component 20, fluid flow sensors, and meters configured for monitoring electricity generation. The electronic control unit 46 may control the harvesting of energy under predetermined conditions of the vehicle 10. For example, after the vehicle 10 has operated for a sufficient period of time to ensure that a temperature differential between the first region 12 and the second region 14 is at an optimal difference the electronic control unit 46 may start the energy harvesting system 42, 142, 242, 342, 442, 542. An electronic control unit 46 may also provide the option to manually override the heat engine 16, 116, 216, 316, 416, 516 to allow the energy harvesting system 42, 142, 242, 342, 442, 542 to be turned off. A clutch (not shown) controlled by the electronic control unit 46 may be used to disengage the heat engine 16, 116, 216, 316, 416, 516 from the component 20.

As also shown in FIG. 1, the energy harvesting system 42, 142, 242, 342, 442, 542 includes a transfer medium 48 configured for conveying electricity EE from the energy harvesting system 42, 142, 242, 342, 442, 542. In particular, the transfer medium 48 may convey electricity EE from the component/generator 20. The transfer medium 48 may be, for example, a power line or an electrically-conductive cable. The transfer medium 48 may convey electricity EE from the component/generator 20 to a storage device 54, e.g., a battery for the vehicle 10. The storage device 54 may also be located proximate to but separate from the vehicle 10. Such a storage device 54 may allow the energy harvesting system 42, 142, 242, 342, 442, 542 to be utilized with a parked vehicle such as 10. For example, the energy harvesting system 42, 142, 242, 342, 442, 542 may take advantage of a temperature differential created by sun load on a hood for the compartment 40 and store the electrical energy EE generated in the storage device 54.

Whether the energy from the energy harvesting system 42, 142, 242, 342, 442, 542 is used to drive a component 20 directly or stored for later usage the energy harvesting system 42, 142, 242, 342, 442, 542 provides additional energy to the vehicle 10 and reduces the load on the main energy sources for driving the vehicle 10. Thus, the energy harvesting system 42, 142, 242, 342, 442, 542 increases the fuel economy and range for the vehicle 10. As described above, the energy harvesting system 42, 142, 242, 342, 442, 542 may operate autonomously requiring no input from the vehicle 10.

It is to be appreciated that for any of the aforementioned examples, the vehicle 10 and/or the energy harvesting system 42, 142, 242, 342, 442, 542 may include a plurality of heat engines 16, 116, 216, 316, 416, 516 and/or a plurality of components 20. That is, one vehicle 10 may include more than one heat engine 16, 116, 216, 316, 416, 516 and/or component 20. For example, one heat engine 16, 116, 216, 316, 416, 516 may drive more than one component 20. Likewise, vehicle 10 may include more than one energy harvesting system 42, 142, 242, 342, 442, 542, each including at least one heat engine 16, 116, 216, 316, 416, 516 and component 20. Multiple heat engines 16, 116, 216, 316, 416, 516 may take advantage of multiple regions of temperature differentials throughout the vehicle 10.

Figure 2:
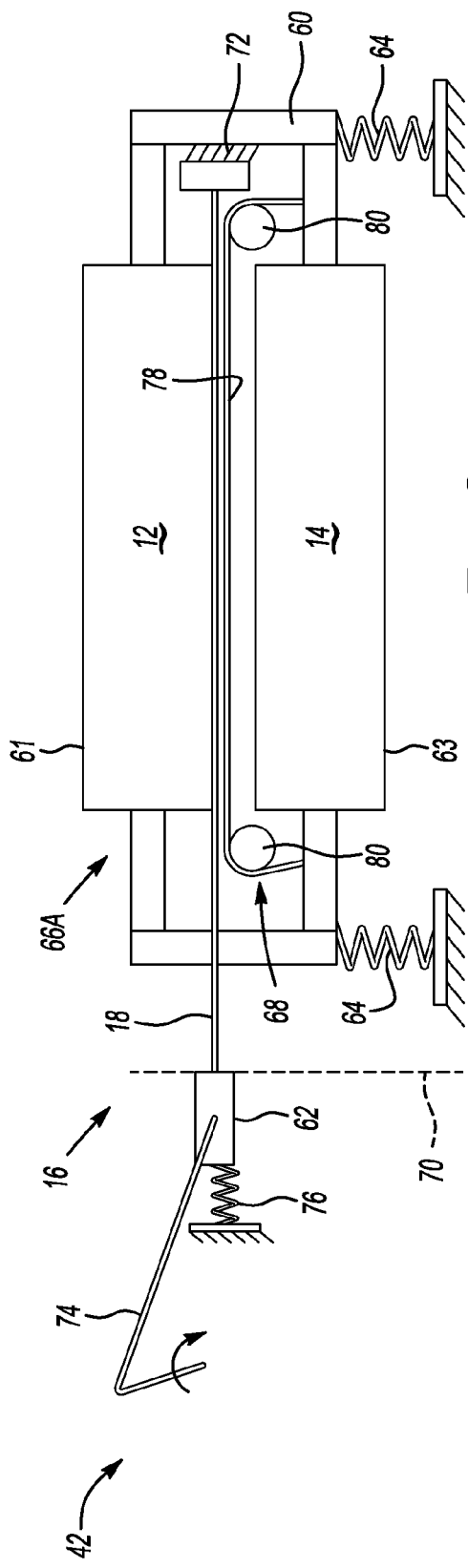
FIG. 2 is a schematic side view of a first embodiment of the energy harvesting system of FIG. 1 in a first position.

Referring now to FIGS. 1 and 2, the heat engine 16 is configured for converting thermal energy, e.g., heat, to mechanical energy or heat to mechanical energy and then to electrical energy, as set forth in more detail below. The heat engine 16 includes a shape memory alloy 18 (FIG. 2) having a crystallographic phase changeable between austenite and martensite at a specific temperature to which the shape memory alloy 18 is exposed in one of the first region 12 and the second region 14. In response to the temperature difference of the first region 12 and the second region 14 (FIG. 1) the shape memory alloy 18 undergoes the crystallographic phase change while passing between the first region 12 and the second region 14. The below description is in reference to FIG. 2. However, the shape memory alloy 18 of all the embodiments operates in a similar manner.

As used herein, the terminology "shape memory alloy" refers to alloys which exhibit a shape memory effect. That is, the shape memory alloy 18 may undergo a solid state phase change via molecular rearrangement to shift between a martensite phase, i.e., "martensite", and an austenite phase, i.e., "austenite". Stated differently, the shape memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy 18 begins to change from the austenite phase to the martensite phase is known as the martensite start temperature, $M_s$. The temperature at which the shape memory alloy 18 completes the change from the austenite phase to the martensite phase is known as the martensite finish temperature, $M_f$. Similarly, as the shape memory alloy 18 is heated, the temperature at which the shape memory alloy 18 begins to change from the martensite phase to the austenite phase is known as the austenite start temperature, $A_s$. And, the temperature at which the shape memory alloy 18 completes the change from the martensite phase to the austenite phase is known as the austenite finish temperature, $A_f$.

Therefore, the shape memory alloy 18 may be characterized by a cold state, i.e., when a temperature of the shape memory alloy 18 is below the martensite finish temperature $M_f$ of the shape memory alloy 18. Likewise, the shape memory alloy 18 may also be characterized by a hot state, i.e., when the temperature of the shape memory alloy 18 is above the austenite finish temperature $A_f$ of the shape memory alloy 18.

In operation, i.e., when exposed to the temperature difference of first region 12 and the second region 14, the shape memory alloy 18, if pre-strained or subjected to tensile stress, can change dimension upon changing crystallographic phase to thereby convert thermal energy to mechanical energy. That is, the shape memory alloy 18 may change crystallographic phase from martensite to austenite and thereby dimensionally contract if pseudoplastically pre-strained so as to convert thermal energy to mechanical energy. Conversely, the shape memory alloy 18 may change crystallographic phase from austenite to martensite and if under stress thereby dimensionally expand so as to convert thermal energy to mechanical energy.

Pseudoplastically pre-strained refers to stretching the shape memory alloy 18 while in the martensite phase so that the strain exhibited by the shape memory alloy 18 under that loading condition is not fully recovered when unloaded, where purely elastic strain would be fully recovered. In the case of shape memory alloy 18, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy 18 transforms to its austenite phase, that strain can be recovered, returning the shape memory alloy 18 to the original length observed prior to any load applied. Shape memory alloy 18 is typically stretched before installation into the heat engine 18, such that the nominal length of the shape memory alloy 18 includes that recoverable pseudoplastic strain, which provides the motion used for actuating/driving the heat engine 16. Without pre-stretching the shape memory alloy 18, little deformation would be seen during phase transformation.

The shape memory alloy 18 may have any suitable composition. In particular, the shape memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy 18 can be binary, ternary, or any higher order so long as the shape memory alloy 18 exhibits a shape memory effect, e.g., a change in shape orientation, damping capacity, and the like. A skilled artisan may select the shape memory alloy 18 according to desired operating temperatures within the compartment 40 (FIG. 1), as set forth in more detail below. In one specific example, the shape memory alloy 18 may include nickel and titanium.

Further, the shape memory alloy 18 may have any suitable form, i.e., shape. For example, the shape memory alloy 18 may have a form selected from the group including bias members (such as springs), tapes, wires, bands, and combinations thereof. Referring to FIG. 2, in one variation, the shape memory alloy 18 may be formed as a discrete length of wire.

The heat engine 16, and more specifically, the shape memory alloy 18 (FIG. 2) of the heat engine 16, is disposed in thermal contact or heat exchange relation with each of the first region 12 and the second region 14. Therefore, the shape memory alloy 18 may change crystallographic phase between austenite and martensite upon thermal contact or heat exchange relation with one of the first region 12 and the second region 14. For example, upon contact with the first region 12, the shape memory alloy 18 may change from martensite to austenite. Likewise, upon thermal contact with the second region 14, the shape memory alloy 18 may change from austenite to martensite.

Further, the shape memory alloy 18 may change both modulus and dimension upon changing crystallographic phase to thereby convert thermal energy to mechanical energy. More specifically, the shape memory alloy 18, if pseudoplastically pre-strained may dimensionally contract upon changing crystallographic phase from martensite to austenite and may dimensionally expand, if under tensile stress, upon changing crystallographic phase from austenite to martensite to thereby convert thermal energy to mechanical energy. Therefore, for any condition wherein the temperature difference exists between the first temperature of the first region 12 and the second temperature of the second region 14, i.e., wherein the first region 12 and the second region 14 are not in thermal equilibrium, the shape memory alloy 18 may dimensionally expand and contract upon changing crystallographic phase between martensite and austenite. And, the change in crystallographic phase of the shape memory alloy 18 may cause the shape memory alloy to drive a linear actuator (shown in FIG. 2) and, thus, drive the component 20.

Figure 3:
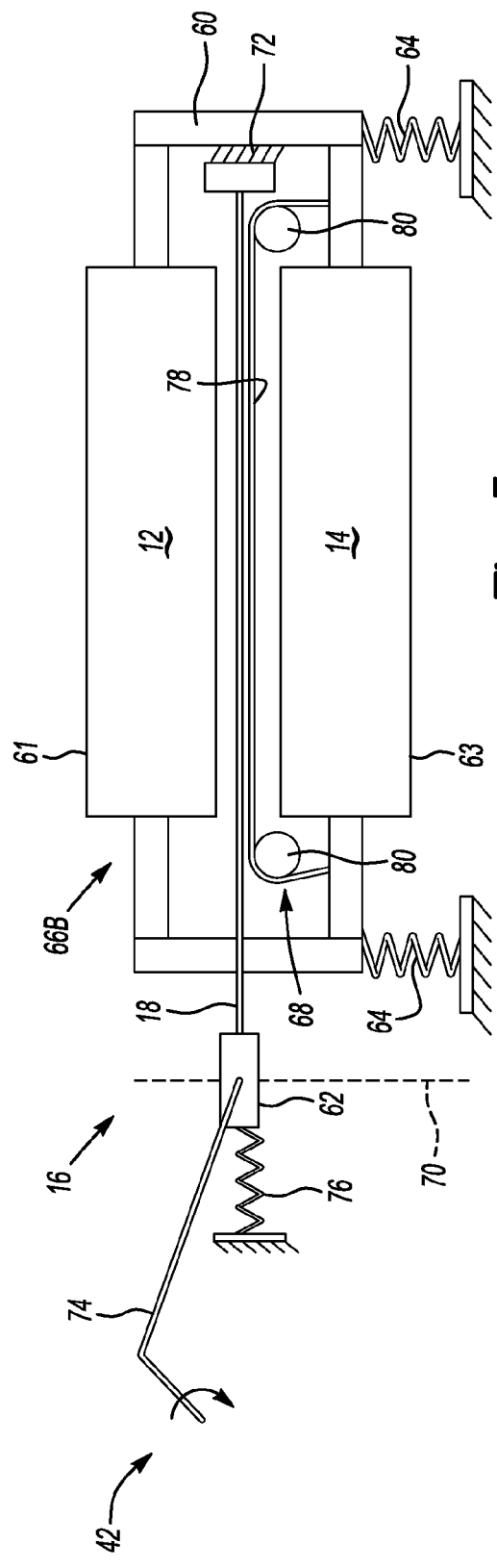
FIG. 3 is a schematic side view of the first embodiment of the energy harvesting system of FIGS. 1 and 6 in a second position.

FIGS. 2 and 3 illustrate a first embodiment of the heat engine 16 for an energy harvesting device 42. A first discrete length of a shape memory alloy 18 wire extends from a frame 60 to a motion conversion mechanism 62. The first region 12 is located on one side of the shape memory alloy 18 and the second region 14 is located on the opposing side of the shape memory alloy 18. In the embodiment shown, the first region 12 may include an object 61 which is a hot or cold sink. Likewise, the second region 14 may include an object 63 which is a cold or hot sink to heat or cool the surrounding environment.

The first region 12 has a first temperature and the second region 14 has a second temperature that is different from the first temperature. The shape memory alloy 18 is disposed in thermal contact or heat exchange relation with each of the first region 12 and the second region 14, alternately. Therefore, the shape memory alloy 18 may change crystallographic phase between austenite and martensite upon thermal contact or heat exchange relation with the first region 12 and the second region 14.

The frame 60 is supported by a plurality of return springs 64. The frame 60 is moveable between a first position 66A, shown in FIG. 2, and a second position 66B, shown in FIG. 3. An actuator 68 controls the movement of the frame 60 between the first position 66A and the second position 66B, as explained in further detail below. As the frame 60 moves between the first position 66A and the second position 66B, the shape memory alloy 18 is exposed to thermal contact or heat exchange relation with the first region 12 and the second region 14. The first region 12 and the second region 14 may each be an object that is a heat source or a heat sink, which are each mounted to the frame 60. As the frame 60 is moved by the actuator 68 the first region 12 and the second region 14 are alternately moved into thermal contact or heat exchange relation with the shape memory alloy 18. The exposure to the first region 12 and the second region 14 causes the shape memory alloy 18 to dimensionally expand and contract. Additionally, the modulus of the shape memory alloy 18 changes as the shape memory alloy 18 is exposed to thermal contact or heat exchange relation with the first region 12 and the second region 14. That is, the temperature differential between the first region 12 and the second region 14 causes the shape memory alloy 18 to sufficiently dimensionally contract or expand. In response to the dimensional expanding and contracting and the accompanying changes in modulus the shape memory alloy 18 oscillates in length. The shape memory alloy 18 is at least partially linearly displaced to apply a repeated linear force on the motion conversion mechanism 62. This is illustrated by the phantom line 70, which has a fixed distance from the frame 60. As can be seen by comparing the location of the motion conversion mechanism 62 to the phantom line 70, as the shape memory alloy 18 sufficiently dimensionally contracts the motion conversion mechanism 62 is moved linearly toward the frame 60 (illustrated in FIG. 3) and as the shape memory alloy 18 sufficiently dimensionally expands the motion conversion mechanism 62 moves linearly away from the frame 60, to the original position (shown in FIG. 2).

Additionally, the shape memory alloy 18 may be secured to the frame 60 through a damper 72 or other mechanism for providing protection against overloading of force on the shape memory alloy 18 during operation of the heat engine 16. For example, the damper 72 may provide damping protection in instances wherein the force on the shape memory alloy 18 between the frame 60 and the motion conversion mechanism 62 is higher than a desired level.

In the embodiment shown, the motion conversion mechanism 62 is a slider-crank mechanism, which converts the linear motion input from the shape memory alloy 18 to a rotational output, as indicated by the output 74. The motion conversion mechanism 62 may also include a bias member 76, such as a spring. The bias member 76 may apply a nominal tensile force to the shape memory alloy 18 to assist the shape memory alloy 18 in returning to the expanded length, as the shape memory alloy 18 moves between the first region 12 and the second region 14.

The actuator 68 controls the movement of the frame 60 to alternately move the first region 12 and the second region 14 into thermal contact or heat exchange relation with the shape memory alloy 18. In the embodiment shown, the actuator 68 comprises a wire 78 that has a generally parallel extending portion with the shape memory alloy 18. The wire 78 is secured between two fixed locations on the frame 60. Pulleys 80 are spaced apart from one another and guide the wire 78 from the portion that is parallel to the shape memory alloy 18 toward the frame 60 for attachment. The wire 78 is preferably a second discrete element of the shape memory alloy that sufficiently dimensionally expands and contracts as it is exposed to the first region 12 and the second region 14. As the wire 78 contracts the shortened length moves the frame 60 from the first position 66A, shown in FIG. 2, to the second position 66B, shown in FIG. 3. Likewise, as the wire 78 expands the elongated length allows the frame 60 to move from the second position 66B back to the first position 66A. As the wire 78 enters heat exchange relation with the first region 12 the wire 78 contracts and moves the frame 60. The frame 60 is moved from the first region 12 to the second region 14, wherein the heat exchange relation with the second region 14 will then cause the wire to expand moving the frame back toward the first region 12. The thermal contact or heat exchange relation of the wire 78 with the first region 12 and the second region 14 therefore controls the position of the frame 60. Return springs 64 may provide a nominal force on the wire 78 to assist the wire in expanding as the wire 78 moves the frame 60 from the second position 66B to the first position 66A

Figure 4:
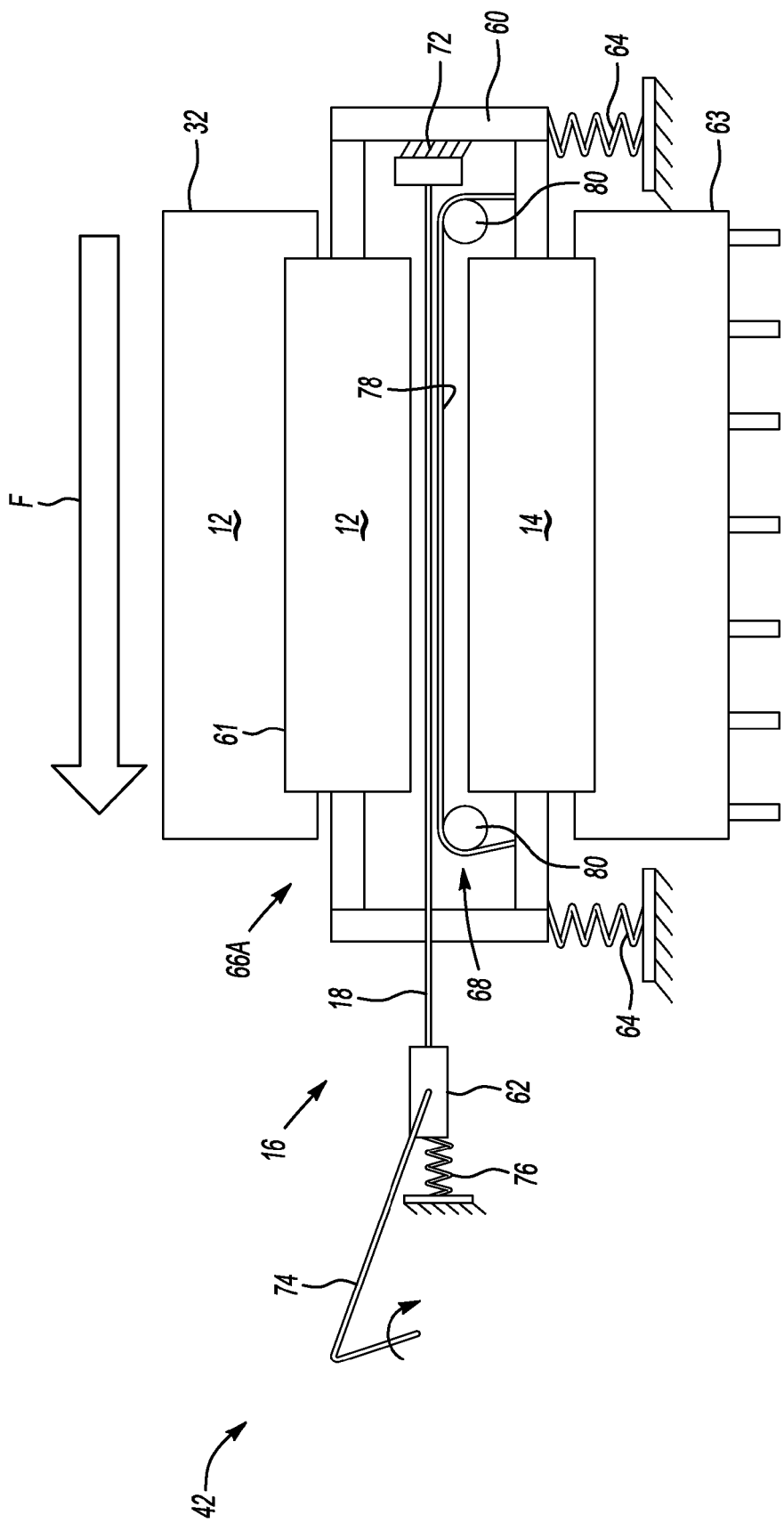
FIG. 4 is a schematic side view of the first embodiment of the energy harvesting system of FIGS. 1-3 for use with an exhaust system for the vehicle.

FIG. 4 illustrates an example of the heat engine 16 for use with an exhaust system of the vehicle 10. The exhaust system includes an exhaust pipe 32. Exhaust gasses, indicated by arrow F, flow through the exhaust pipe 32. The exhaust pipe 32 may be the object 61 within the first region 12 that acts as a heat source. Alternatively, the object 61 may be conductive material that may be secured to the exhaust pipe 32 to act as the heat sink. Likewise, the object 63 located in the second region 14 may be a cold sink to maintain a sufficient temperature differential between the first region 12 and the second region 14. FIG. 4 illustrates the heat engine 16 in the first position 66A. However, the heat engine 16 operates in a similar manner as described above.

FIGS. 5 and 6 illustrate a second embodiment of the heat engine 116 for an energy harvesting device 142. A first discrete length of a shape memory alloy 118 wire extends from a frame 160 to a motion conversion mechanism 162. The first region 12 is located on one side of the shape memory alloy 118 and the second region 14 is located on the opposing side of the shape memory alloy 118. In the embodiment shown, the first region 12 may include an object 161 which is a hot or cold sink. Likewise, the second region 14 may include an object 163 which is a cold or hot sink. Alternatively, the first region 12 may be the object 161 and the second region 14 may be the object 163. Therefore, the first region 12 has a first temperature and the second region 14 has a second temperature that is different from the first temperature. The shape memory alloy 118 is disposed in thermal contact or heat exchange relation with each of the first region 12 and the second region 14, alternately. In the instance where the objects 161, 163 are the first region 12 and second region 14 the shape memory alloy 118 physically contacts the objects 161, 163 to exchange heat. Therefore, the shape memory alloy 118 may change crystallographic phase between austenite and martensite upon thermal contact or heat exchange relation with the first region 12 and the second region 14.

The frame 160 is supported by a plurality of return springs 164. The frame 160 is moveable between a first position 166A, shown in FIG. 5, and a second position 166B, shown in FIG. 6. An actuator 168 controls the movement of the frame 160 between the first position 166A and the second position 166B, as explained in further detail below. As the frame 160 moves between the first position 166A and the second position 166B, the shape memory alloy 118 is exposed to thermal contact or heat exchange relation with the first region 12 and the second region 14. The first region 12 and the second region 14 may each be an object that is a heat source or a heat sink, which are each mounted to the frame 160. As the frame 160 is moved by the actuator 168 the first region 12 and the second region 14 are alternately moved into thermal contact or heat exchange relation with the shape memory alloy 118. The exposure to the first region 12 and the second region 14 causes the shape memory alloy 118 to dimensionally expand and contract. Additionally, the modulus of the shape memory alloy 118 changes as the shape memory alloy 118 is exposed to thermal contact or heat exchange relation with the first region 12 and the second region 14. That is, the temperature differential between the first region 12 and the second region 14 causes the shape memory alloy 118 to sufficiently dimensionally contract or expand. In response to the dimensional expanding and contracting and the accompanying changes in modulus the shape memory alloy 118 oscillates in length. The shape memory alloy 118 is at least partially linearly displaced to apply a repeated linear force on the motion conversion mechanism 162. This is illustrated by the phantom line 170, which has a fixed distance from the frame 160. As can be seen by comparing the location of the motion conversion mechanism 162 to the phantom line 170, as the shape memory alloy 118 sufficiently dimensionally contracts the motion conversion mechanism 162 is moved linearly toward the frame 160 (illustrated in FIG. 6) and as the shape memory alloy 118 sufficiently dimensionally expands the motion conversion mechanism 162 moves linearly away from the frame 160, to the original position (shown in FIG. 5).

Additionally, the shape memory alloy 118 may be secured to the frame 160 through a damper 172 or other mechanism for providing protection against overloading of force on the shape memory alloy 118 during operation of the heat engine 116. For example, the damper 172 may provide damping protection in instances wherein the force on the shape memory alloy 118 between the frame 160 and the motion conversion mechanism 162 is higher than a desired level.

In the embodiment shown, the motion conversion mechanism 162 is a slider-crank mechanism, which converts the linear motion input from the shape memory alloy 118 to a rotational output, as indicated by the output 174. The motion conversion mechanism 162 may also include a bias member 176, such as a spring. The bias member 176 may apply a nominal tensile force to the shape memory alloy 118 to assist the shape memory alloy 18 in returning to the expanded length, as the shape memory alloy 118 moves between the first region 12 and the second region 14.

The actuator 168 controls the movement of the frame 160 to alternately move the first region 12 and the second region 14 into thermal contact or heat exchange relation with the shape memory alloy 118. In the embodiment shown, the actuator 168 comprises a linear actuator 178, a controller 180, and a sensor 182. The actuator 178 moves the frame 160 between the first position 166A, shown in FIG. 5, and the second position 166B, shown in FIG. 6. The sensor 182 may include a position sensor, a timer, a temperature sensor, or combinations thereof. The data from the sensor 182 is input into the controller 180. The controller 180 utilizes the data from the sensor 178 to control actuation of the actuator 178 to move the frame 160 between the first position 166A and the second position 166B and thus, move the shape memory alloy 118 between the first region 12 and the second region 14.

FIGS. 7 and 8 illustrate a third embodiment of the heat engine 216 for use with an energy harvesting device 242. A shape memory alloy 218 extends from a frame 260 to a motion conversion mechanism 262. The first region 12 is located on one side of the shape memory alloy 218 and the second region 14 is located on the opposing side of the shape memory alloy 218. In the embodiment shown, the first region 12 may include an object 261 which is a hot or cold sink. Likewise, the second region 14 may include an object 263 which is a cold or hot sink. Alternatively, the first region 12 may be the object 261 and the second region 14 may be the object 263. Therefore, the first region 12 has a first temperature and the second region 14 has a second temperature that is different from the first temperature. The shape memory alloy 218 is disposed in thermal contact or heat exchange relation with each of the first region 12 and the second region 14, alternately. In the instance where the objects 261, 263 are the first region 12 and second region 14 the shape memory alloy 218 physically contacts the objects 261, 263 to exchange heat. Therefore, the shape memory alloy 218 may change crystallographic phase between austenite and martensite upon thermal contact or heat exchange relation with one of the first region 12 and the second region 14.

The frame 260 is supported by a plurality of return springs 264. The frame 260 is moveable between a first position 266A, shown in FIG. 7, and a second position 266B, shown in FIG. 8. An actuator 268 controls the movement of the frame 260 between the first position 266A and the second position 266B, as explained in further detail below. As the frame 260 moves between the first position 266A and the second position 266B, the shape memory alloy 218 is exposed to thermal contact or heat exchange relation with the first region 12 and the second region 14. The first region 12 and the second region 14 may be an object that is a heat source or a heat sink, which are each mounted to the frame 260. As the frame 260 is moved by the actuator 268 the first region 12 and the second region 14 are alternately moved into thermal contact or heat exchange relation with the shape memory alloy 218. The exposure to the first region 12 and the second region 14 causes the shape memory alloy 218 to dimensionally expand and contract. Additionally, the modulus of the shape memory alloy 218 changes as the shape memory alloy 218 is exposed to thermal contact or heat exchange relation with the first region 12 and the second region 14. That is, the temperature differential between the first region 12 and the second region 14 causes the shape memory alloy 218 to sufficiently dimensionally contract or expand. In response to the dimensional expanding and contracting and the accompanying changes in modulus the shape memory alloy 218 oscillates in length. The shape memory alloy 218 is at least partially linearly displaced to apply a repeated linear force on the motion conversion mechanism 262. This is illustrated by the phantom line 270, which has a fixed distance from the frame 260. As can be seen by comparing the location of the motion conversion mechanism 262 to the phantom line 270, as the shape memory alloy 218 sufficiently dimensionally contracts the motion conversion mechanism 262 is moved linearly toward the frame 260 (illustrated in FIG. 8) and as the shape memory alloy 218 sufficiently dimensionally expands the motion conversion mechanism 262 moves linearly away from the frame 260, to the original position (shown in FIG. 7).

Additionally, the shape memory alloy 218 may be secured to the frame 260 through a damper 272 or other mechanism for providing protection against overloading of force on the shape memory alloy 218 during operation of the heat engine 216. For example, the damper 272 may provide damping protection in instances wherein the force on the shape memory alloy 218 between the frame 260 and the motion conversion mechanism 262 is higher than a desired level.

In the embodiment shown, the motion conversion mechanism 262 converts the linear motion input from the shape memory alloy 218 to a hydraulic power for a pump or accumulator 274 which may then be used to power the component 20, such as a generator. The motion conversion mechanism 262 may also include a bias member 276, such as a spring. The bias member 276 may apply a nominal tensile force to the shape memory alloy 218 to assist the shape memory alloy 218 in returning to the expanded length, as the shape memory alloy 218 moves between the first region 12 and the second region 14.

The actuator 268 controls the movement of the frame 260 to alternately move the first region 12 and the second region 14 into thermal contact or heat exchange relation with the shape memory alloy 218. In the embodiment shown, the actuator 268 comprises a linear actuator 278, a controller 280, and a sensor 282. The actuator 278 moves the frame 260 between the first position 266A, shown in FIG. 7, and the second position 266B, shown in FIG. 8. The sensor 282 may include a position sensor, a timer, a temperature sensor, or combinations thereof. The data from the sensor 282 is input into the controller 280. The controller 280 utilizes the data from the sensor 282 to control actuation of the actuator 278 to move the frame 260 between the first position 266A and the second position 266B and thus, move the shape memory alloy between the first region 12 and the second region 14.

It is to be appreciated that for any of the aforementioned examples, the vehicle 10 and/or the energy harvesting system 242 may include a plurality of heat engines 216 and/or a plurality of components 20. That is, one vehicle 10 may include more than one heat engine 216 and/or component 20. For example, one heat engine 216 may drive more than one component 20. Likewise, vehicle 10 may include more than one energy harvesting system 242, each including at least one heat engine 216 and component 20. Multiple heat engines 216 may take advantage of multiple regions of temperature differentials throughout the vehicle 10.

FIGS. 9 and 10 illustrate a sixth embodiment of the heat engine 316. A first discrete element of a shape memory alloy 318 extends from a frame 360 to a motion conversion mechanism 362. The first region 12 is located on one side of the shape memory alloy 318 and the second region 14 is located on the opposing side of the shape memory alloy 318. In the embodiment shown, the first region 12 may include an object 361 which is a hot or cold sink. Likewise, the second region 14 may include an object 363 which is a cold or hot sink. Alternatively, the first region 12 may be the object 361 and the second region 14 may be the object 363. Therefore, the first region 12 has a first temperature and the second region 14 has a second temperature that is different from the first temperature. The shape memory alloy 318 is disposed in thermal contact or heat exchange relation with each of the first region 12 and the second region 14, alternately. In the instance where the objects 361, 363 are the first region 12 and second region 14 the shape memory alloy 318 physically contacts the objects 361, 363 to exchange heat. Therefore, the shape memory alloy 318 may change crystallographic phase between austenite and martensite upon thermal contact or heat exchange relation with the first region 12 and the second region 14.

The frame 360 is supported by a plurality of return springs 364. The frame 360 is moveable between a first position 366A, shown in FIG. 9, and a second position 366B, shown in FIG. 10. An actuator 368 controls the movement of the frame 360 between the first position 366A and the second position 366B, as explained in further detail below. As the frame 360 moves between the first position 366A and the second position 366B, the shape memory alloy 318 is exposed to thermal contact or heat exchange relation with the first region 12 and the second region 14. The first region 12 and the second region 14 may each be an object that is a heat source or a heat sink, which are each mounted to the frame 360. As the frame 360 is moved by the actuator 368 the first region 12 and the second region 14 are alternately moved into thermal contact or heat exchange relation with the shape memory alloy 318. The exposure to the first region 12 and the second region 14 causes the shape memory alloy 318 to dimensionally expand and contract. Additionally, the modulus of the shape memory alloy 318 changes as the shape memory alloy 318 is exposed to thermal contact or heat exchange relation with the first region 12 and the second region 14. That is, the temperature differential between the first region 12 and the second region 14 causes the shape memory alloy 318 to sufficiently dimensionally contract or expand. In response to the dimensional expanding and contracting and the accompanying changes in modulus the shape memory alloy 318 oscillates in length. The shape memory alloy 318 is at least partially linearly displaced to apply a repeated linear force on the motion conversion mechanism 362. This is illustrated by the phantom line 370, which has a fixed distance from the frame 360. As can be seen by comparing the location of the motion conversion mechanism 362 to the phantom line 370, as the shape memory alloy 318 sufficiently dimensionally contracts the motion conversion mechanism 362 is moved linearly toward the frame 360 (illustrated in FIG. 10) and as the shape memory alloy 318 sufficiently dimensionally expands the motion conversion mechanism 362 moves linearly away from the frame 360, to the original position (shown in FIG. 9).

Additionally, the shape memory alloy 318 may be secured to the frame 360 through a damper 372 or other mechanism for providing protection against overloading of force on the shape memory alloy 318 during operation of the heat engine 316. For example, the damper 372 may provide damping protection in instances wherein the force on the shape memory alloy 318 between the frame 360 and the motion conversion mechanism 362 is higher than a desired level.

In the embodiment shown, the motion conversion mechanism 362 is a slider-crank mechanism, which converts the linear motion input from the shape memory alloy 318 to a rotational output, as indicated by the output 374. The motion conversion mechanism 362 may also include a bias member 376, such as a spring. The bias member 376 may apply a nominal tensile force to the shape memory alloy 318 to assist the shape memory alloy 318 in returning to the expanded length, as the shape memory alloy 318 moves between the first region 12 and the second region 14.

The actuator 368 controls the movement of the frame 360 to alternately move the first region 12 and the second region 14 into thermal contact or heat exchange relation with the shape memory alloy 318. In the embodiment shown, the actuator 368 is a cam 378 that is pivotably mounted to the shape memory alloy 318 to bias the frame 360 toward the second frame position 366B. The shape memory alloy 318 dimensionally expands and contracts as it moves between the first region 12 and the second region 14. As shape memory alloy 318 contracts the shortened length and rotates the cam 378 from the first position 366A, shown in FIG. 9, to the second position 366B, shown in FIG. 10 to move the frame 360. Likewise, as the wire 378 expands the elongated length allows the cam 378 and the frame 360 to move from the second position 366B back to the first position 366A. The thermal contact or heat exchange relation of the shape memory alloy 318 with the first region 12 and the second region 14 therefore controls the position of the frame 360 and drives the heat engine 16. Return springs 364 may provide a nominal force on the shape memory alloy 318 to assist the shape memory alloy 318 in expanding as the shape memory alloy 318 moves the frame 360 from the second position 366B to the first position 366A

FIGS. 11 and 12 illustrate a fifth embodiment of the heat engine 416 for an energy harvesting device 442. A first discrete element of a shape memory alloy 418 wire extends from a support 484 to a motion conversion mechanism 462. The first region 12 is located on one side of the shape memory alloy 418 and the second region 14 is located on the opposing side of the shape memory alloy 418. In the embodiment shown, the first region 12 may be or include an object 461 which is a hot or cold sink mounted to a stationary frame 460. Likewise, the second region 14 may be or include an object 463 which is a cold or hot sink. Alternatively, the first region 12 may be the object 461 and the second region 14 may be the object 463. Therefore, the first region 12 has a first temperature and the second region 14 has a second temperature that is different from the first temperature. The shape memory alloy 418 is disposed in thermal contact or heat exchange relation with each of the first region 12 and the second region 14, alternately. In the instance where the objects 461, 463 are the first region 12 and second region 14 the shape memory alloy 418 physically contacts the objects 461, 463 to exchange heat. Therefore, the shape memory alloy 418 may change crystallographic phase between austenite and martensite upon thermal contact or heat exchange relation with one of the first region 12 and the second region 14.

The support 484 is supported by a return spring 464. The support 484 is moveable between a first position 466A, shown in FIG. 11, and a second position 466B, shown in FIG. 12. The frame 460 which supports the first object 461 and the second object 462 remains stationary. An actuator 468 controls the movement of the support 484 between the first position 466A and the second position 466B, as explained in further detail below. As the support 484 moves between the first position 466A and the second position 466B, the shape memory alloy 418 is exposed to thermal contact or heat exchange relation with the first region 12 and the second region 14. The first region 12 and the second region 14 may each be an object that is a heat source or a heat sink, which are each mounted to the frame 460. As the frame 460 is moved by the actuator 468 the first region 12 and the second region 14 are alternately moved into thermal contact or heat exchange relation with the shape memory alloy 18. The exposure to the first region 12 and the second region 14 causes the shape memory alloy 418 to dimensionally expand and contract. Additionally, the modulus of the shape memory alloy 418 changes as the shape memory alloy 418 is exposed to thermal contact or heat exchange relation with the first region 12 and the second region 14. That is, the temperature differential between the first region 12 and the second region 14 causes the shape memory alloy 418 to sufficiently dimensionally contract or expand. In response to the dimensional expanding and contracting and the accompanying changes in modulus the shape memory alloy 318 oscillates in length. The shape memory alloy 418 is at least partially linearly displaced to apply a repeated linear force on the motion conversion mechanism 462. This is illustrated by the phantom line 470, which has a fixed distance from the frame 460. As can be seen by comparing the location of the motion conversion mechanism 462 to the phantom line 470, as the shape memory alloy 418 sufficiently dimensionally contracts the motion conversion mechanism 462 is moved linearly toward the frame 460 (illustrated in FIG. 12) and as the shape memory alloy 418 sufficiently dimensionally expands the motion conversion mechanism 462 moves linearly away from the frame 460, to the original position (shown in FIG. 11).

Additionally, the shape memory alloy 418 may be secured to the support 484 through a damper 472 or other mechanism from providing protection against overloading of force on the shape memory alloy 418 during operation of the heat engine 416. For example, the damper 472 may provide damping protection in instances wherein the force on the shape memory alloy 418 between the support 484 and the motion conversion mechanism 462 is higher than a desired level.

In the embodiment shown, the motion conversion mechanism 462 is a slider-crank mechanism, which converts the linear motion input from the shape memory alloy 418 to a rotational output, as indicated by the output 474. The motion conversion mechanism 462 may also include a bias member 476, such as a spring. The bias member 476 may apply a nominal tensile force to the shape memory alloy 418 to assist the shape memory alloy 18 in returning to the expanded length, as the shape memory alloy 418 moves between the first region 12 and the second region 14.

The actuator 468 movement of the frame 460 to alternately move the shape memory alloy 418 into thermal contact or heat exchange relation with the first region 12 and the second region 14. In the embodiment shown, the actuator 468 comprises a linear actuator 478, a controller 480, and a sensor 482. The actuator 478 moves the support 484 between the first position 466A, shown in FIG. 11, and the second position 466B, shown in FIG. 12. As the support moves between the first position 466A and the second position 466B the shape memory alloy 418 is moved between the first region 12 and the second region 14. The sensor 482 may include a position sensor, a timer, a temperature sensor, or combinations thereof. The data from the sensor 482 is input into the controller 480. The controller 480 utilizes the data from the sensor 478 to control actuation of the actuator 478 to move the support 484 between the first position 466A and the second position 466B and thus, the shape memory alloy 418 is exposed to the first region 12 and the second region 14.

FIGS. 13 and 14 illustrate a sixth embodiment of the heat engine 516 for an energy harvesting device 542. A first discrete length of a shape memory alloy 518 wire extends from a support 560 to a motion conversion mechanism 562. The first region 12 is located proximate to the support 560 and the second region 14 is located proximate to the motion conversion mechanism 562 for the heat engine 516.

The heat engine 516 may be located proximate to a conduit 532. The conduit 532 generally surrounds or is located within the first region 12. Fluid may flow through the conduit 532. Although the first region 12 may be mostly or entirely located within the conduit 532, the shape memory alloy 518 is in thermal contact or heat exchange relationship with the first region 12. The fluid within the energy harvesting system 542 forming the first region 12 and the second region 14 may be selected from a group of gases, liquids, and combinations thereof. The fluid may be for example vehicle exhaust gas, and the first region 12 may be an exhaust pipe for the vehicle 10. The heat engine 516 is located proximate to the exhaust pipe to take advantage of the temperature differential between the interior of the exhaust pipe and the exterior of the exhaust pipe.

Therefore, the first region 12 has a first temperature and the second region 14 has a second temperature that is different from the first temperature. The shape memory alloy 518 is disposed in thermal contact or heat exchange relation with each of the first region 12 and the second region 14, alternately. Therefore, the shape memory alloy 518 may change crystallographic phase between austenite and martensite upon thermal contact or heat exchange relation with the first region 12 and the second region 14.

A spring 564 extends between the motion conversion mechanism 562 and the support 560. The support 560 is moveable between a first position 566A, shown in FIG. 13, and a second position 566B, shown in FIG. 14. An actuator 568 controls the movement of the support 560 between the first position 566A and the second position 566B. In the embodiment shown, the actuator 568 includes the shape memory alloy 518, as explained in further detail below. As the support 560 moves between the first position 566A and the second position 566B, the shape memory alloy 518 is exposed to thermal contact or heat exchange relation with the first region 12 and the second region 14. As the support 560 is moved by the actuator 568, specifically the shape memory alloy 518, the first region and the second region are alternately in thermal contact or heat exchange relation with the shape memory alloy 518. The exposure to the first region 12 and the second region 14 causes the shape memory alloy 518 to dimensionally expand and contract. Additionally, the modulus of the shape memory alloy 518 changes as the shape memory alloy 518 is exposed to thermal contact or heat exchange relation with the first region 12 and the second region 14. That is, the temperature differential between the first region 12 and the second region 14 causes the shape memory alloy 518 to sufficiently dimensionally contract or expand.

In response to the dimensional expanding and contracting and the accompanying changes in modulus the shape memory alloy 518 oscillates in length to apply a repeated linear motion to the motion conversion mechanism 562. As the shape memory alloy 518 sufficiently dimensionally contracts the support 560 (illustrated in FIG. 14) moves linearly toward the motion conversion mechanism 562 and as the shape memory alloy 518 sufficiently dimensionally expands the support 560 moves linearly away from the motion conversion mechanism 562, to the original position (shown in FIG. 13).

In the embodiment shown, the motion conversion mechanism 562 is a generator which converts the linear motion input from the shape memory alloy 518 to an electrical output. For example, the motion conversion mechanism 562 may be an alternator for the vehicle 10 (shown in FIG. 1). The motion conversion mechanism 562 may also include a piston 586 that extends upward from the support 560 to the motion conversion mechanism 562. A permanent magnet 588 is mounted on the piston 586. As the shape memory alloy 518 sufficiently dimensionally contracts and expands the permanent magnet 588 is moved linearly relative to windings 590 located within the motion conversion mechanism 562 to generate electricity.

The actuator 568 controls the movement of the support 560 to alternately move the first region 12 and the second region 14 into thermal contact or heat exchange relation with the shape memory alloy 518. In the embodiment shown, the actuator 568 comprises the shape memory alloy 518$k$, the thermal barriers 550, the bias member 564, the support 360 and a base 580. The thermal barriers 550 extend from the fixed motion conversion mechanism 562 to the base 580. The base 580 is secured to the piston 586 to move with the connecting piston 586 in response to the contracting and expanding of the shape memory alloy 518.

When the support 560 is in the first position 566A the support 560 is in physical and thermal contact with the conduit 532. The support 560 absorbs heat from the conduit 532. The increasing temperature of the support 560 is in thermal contact with the shape memory alloy 518. Additionally, the shape memory alloy is also in thermal contact with the surrounding air to absorb heat from the support 560 and the conduit 532. As the shape memory alloy 518 is exposed to the first region 12 the shape memory alloy 518 contracts and the shortened length moves the base 580. The base 580 moves from the first position 566A, shown in FIG. 13, to the second position 566B, shown in FIG. 14.

Movement of the base 590 to the second position 566B bends the thermal barriers 550 and allows fluid from the second region 14 to flow over the shape memory alloy 518, as indicated by the arrow F. Additionally the support 560 is moved away from the conduit 532 and begins to cool as well. Both the air flow through the open thermal barriers 550 and the cooling base 560 are in thermal contact with the shape memory alloy 518. Therefore, the shape memory alloy is now in contact with the second region 14. The thermal contact with the second region 14 causes the shape memory alloy 518 to expand and the bias member 564 applies a tensile force. As the shape memory alloy 518 expands the elongated length allows the base 580 to move from the second position 566B back to the first position 566A and the first region 12 moves back into thermal contact or heat exchange relation with the shape memory alloy 518. The thermal contact or heat exchange relation of the shape memory alloy 518 with the first region 12 and the second region 14 therefore controls the position of the base 580 and the support 560. As mentioned above, the bias member 564 may provide a force on the shape memory alloy 518 to assist the wire in expanding as the shape memory alloy 518 moves the base 580 from the second position 566B to the first position 566A Thus, the shape memory alloy 518 is in thermal contact or heat exchange relation with the second region 14 when the thermal barriers 550 are bent, the support 560 is not in contact with the conduit and the base 580 is in the second position 566B. Likewise, the shape memory alloy 518 is in thermal contact or heat exchange relation with the first region 12 when the thermal barriers 550 are closed, the support is contact the conduit 532 and the base 580 is in the first position 566A.

While the best modes for carrying out the invention have been described in detail, those familiar with the art to which this invention relates will recognize various alternative designs and embodiments for practicing the invention within the scope of the appended claims.

The invention claimed is:

1. An energy harvesting system comprising:
a first region having a first temperature;
a second region having a second temperature that is different from said first temperature;
a fixed ground reference;
a heat engine configured for converting thermal energy to mechanical energy wherein the heat engine includes;
   a first discrete element of a shape memory alloy having a crystallographic phase changeable between austenite and martensite in response to the temperature difference between the first region and the second region; and
   wherein the first discrete element of the shape memory alloy expands and contracts in response to the phase change to exert a linear force;
a motion conversion mechanism operatively connected to the first discrete element to be driven by the linear force to oscillate linearly relative to the fixed ground reference;
a component driven by the motion conversion mechanism;
a frame having one of a heat source and a heat sink mounted to the frame within each of the first region and the second region, wherein the frame is moved relative to the first discrete element of the shape memory alloy and is moved relative to the fixed ground reference such that the first discrete element of the shape memory alloy is alternately exposed to both the first region and the second region by the movement of the frame relative to the fixed ground reference;
a second discrete element of the shape memory alloy having a crystallographic phase changeable between austenite and martensite in response to a temperature difference between the first region and the second region, wherein the movement of the frame is in response to the crystallographic phase change of the second discrete element of the shape memory alloy; and
a pair of spaced apart pulleys rotatable mounted to the fixed ground reference, wherein the second discrete element of the shape memory alloy is threaded around the pulleys and fixedly-secured at opposing ends to the frame, such that the crystallographic phase change of the second discrete element of the shape memory alloy moves the frame relative to the first discrete element and moves the frame relative to the fixed ground reference.

2. The energy harvesting system of claim 1, further including a controller to control the movement of the frame, wherein the controller provides a signal to initiate movement of the frame relative to the first discrete element and relative to the fixed ground reference in response to one of a position sensor, a timer, and a temperature sensor located proximate to the shape memory alloy.

3. The energy harvesting system of claim 1, wherein the motion conversion mechanism is a slider-crank mechanism to convert the linear force from the first discrete element to a rotary output to drive the component.

4. The energy harvesting system of claim 1, wherein the motion conversion mechanism is an electro-magnet having a piston driven by the linear force to thereby power the electro-magnet.

5. A method of harvesting energy comprising:
exposing a first discrete element of a shape memory alloy to heat exchange contact with a first region having a first temperature and a second region having a second temperature that is different from the first temperature, wherein the shape memory alloy has a crystallographic phase changeable between austenite and martensite in response to the temperature difference between the first region and the second region;
expanding and contracting the first discrete element of the shape memory alloy in response to the temperature difference between the first region and the second region, such that a linear displacement, relative to a fixed ground reference, of at least a portion of the first discrete element of the shape memory alloy occurs in response to the temperature difference between the first region and the second region;
driving a motion conversion mechanism with the linear displacement of the first discrete element of the shape memory alloy, such that the motion conversion mechanism experiences linear displacement relative to the fixed ground reference; and driving a component with the motion conversion mechanism;

wherein exposing the first discrete element of the shape memory alloy to heat exchange contact with the first region and the second region further includes moving a frame having a heat source and a heat sink mounted thereto, wherein the frame moves the heat source and the heat sink relative to the fixed ground reference and relative to the first discrete element such that the first discrete element is alternately in contact with the heat source and the heat sink as a result of movement of the frame relative to the fixed ground reference, wherein moving the frame relative to the discrete element further includes moving the frame in response to the crystallographic phase change of a second discrete element of the shape memory alloy.

6. The method of claim 5, wherein driving the component with the motion conversion mechanism further comprises converting the linear motion of the discrete element relative to the fixed ground reference into rotary motion.

7. The method of claim 5, wherein driving the component with the motion conversion mechanism further comprises driving a piston for an electro-magnet with the linear displacement of the first discrete element relative to the fixed ground reference, to thereby power the electro-magnet.

8. An energy harvesting system comprising:
a first region having a first temperature;
a second region having a second temperature that is different from said first temperature;
a fixed ground reference;
a heat engine configured for converting thermal energy to mechanical energy wherein the heat engine includes;
a discrete element of a shape memory alloy having a crystallographic phase changeable between austenite and martensite in response to the temperature difference between the first region and the second region, wherein opposing ends of the discrete element are fixed to structure other than the discrete element; and
wherein the discrete element of the shape memory alloy expands and contracts in response to the phase change to exert a linear force;
a frame having one of a heat source and a heat sink mounted to the frame within each of the first region and the second region;
an actuator to move the frame relative to the fixed ground reference and relative to the first discrete element of the shape memory alloy such that the discrete element of the shape memory alloy is alternately exposed to both the first region and the second region by movement of the frame relative to the fixed ground reference;
wherein the frame is moved by the actuator based upon the temperature of the discrete element of the shape memory alloy;
a motion conversion mechanism operatively connected to the discrete element to be driven by the linear force; and
a component driven by the motion conversion mechanism.

9. The energy harvesting system of claim 8, wherein the actuator further includes a controller to control the movement of the frame, wherein the controller provides a signal to initiate movement of the frame, and wherein the signal is provided in response to a temperature sensor located proximate to the discrete element shape memory alloy.

10. The energy harvesting system of claim 8, wherein the motion conversion mechanism changes the linear force from the discrete element to a rotary output to drive the component.

11. The energy harvesting system of claim 8, wherein the first region is one of a hot sink and a cold sink, the second region is the other of a hot sink and a cold sink, and wherein the shape memory alloy alternately physically contacts the hot sink and the cold sink to provide thermal contact with the first region and the second region.

* * * * *